US012776003B2

(12) United States Patent
Choi et al.

(10) Patent No.: US 12,776,003 B2
(45) Date of Patent: Oct. 27, 2026

(54) IMAGE PROCESSING CIRCUIT, IMAGE SIGNAL PROCESSOR INCLUDING THE SAME, AND IMAGE PROCESSING METHOD

(71) Applicant: SAMSUNG ELECTRONICS CO., LTD., Suwon-si (KR)

(72) Inventors: Changhoon Choi, Suwon-si (KR); Kyungrok Kim, Suwon-si (KR); Kisuk Sung, Suwon-si (KR); Youngjun Shin, Suwon-si (KR); Saetek Oh, Suwon-si (KR); Seungwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 18/613,526

(22) Filed: Mar. 22, 2024

(65) Prior Publication Data

US 2024/0320791 A1 Sep. 26, 2024

(30) Foreign Application Priority Data

Mar. 24, 2023 (KR) ........................ 10-2023-0039017
Jul. 4, 2023 (KR) ........................ 10-2023-0086722

(51) Int. Cl.
*G06T 5/40* (2006.01)
*G06T 5/50* (2006.01)
(Continued)

(52) U.S. Cl.
CPC .................. *G06T 5/40* (2013.01); *G06T 5/50* (2013.01); *G06T 7/90* (2017.01); *G06V 10/56* (2022.01);
(Continued)

(58) Field of Classification Search
CPC .... G06T 5/40; G06T 7/90; G06T 5/50; G06T 2207/10024; G06T 2207/20072;
(Continued)

(56) References Cited

U.S. PATENT DOCUMENTS 5,289,295 A 2/1994 Yumiba et al.
6,947,594 B2 9/2005 Watanabe et al.
(Continued)

OTHER PUBLICATIONS

Thanh, et al., "Single Image Dehazing Based on Adaptive Histogram Equalization and Linearization of Gamma Correction", in 25th Asia-Pacific Conference on Communications (APCC), Nov. 6, 2019, pp. 36-40.
(Continued)

*Primary Examiner* — Syed Haider
(74) *Attorney, Agent, or Firm* — Morgan, Lewis & Bockius LLP

(57) ABSTRACT

An image processing circuit, an image signal processor including the same, and an image processing method are disclosed. The image processing circuit may include a contents-aware circuit configured to receive histograms of a current image and a previous image, classify content for each pixel of the current image, and generate a shifting value representing a color shifting effect for each pixel of the current image, a color shifting circuit configured to generate an enhanced image by applying color shifting depending on the shifting value to each pixel of the current image, based on the shifting value, and a histogram generator configured to generate a histogram of the current image based on the classified content of the current image, wherein the generated histogram of the current image is used to generate a shifting value of a subsequent image.

19 Claims, 16 Drawing Sheets

(51) Int. Cl.
*G06T 7/90* (2017.01)
*G06V 10/56* (2022.01)
*G06V 10/764* (2022.01)
*G06V 10/82* (2022.01)

(52) U.S. Cl.
CPC ............ *G06V 10/764* (2022.01); *G06V 10/82* (2022.01); *G06T 2207/10024* (2013.01); *G06T 2207/20072* (2013.01); *G06T 2207/20084* (2013.01)

(58) Field of Classification Search
CPC .......... G06T 2207/20084; G06V 10/56; G06V 10/82; G06V 10/764
See application file for complete search history.

(56) References Cited

U.S. PATENT DOCUMENTS

| | | | | |
|---|---|---|---|---|
| 8,774,553 | B1 * | 7/2014 | Winn | G06T 5/40 382/168 |
| 8,792,712 | B2 | 7/2014 | Han | |
| 9,105,078 | B2 | 8/2015 | Lim et al. | |
| 9,478,173 | B2 | 10/2016 | Safaee-Rad et al. | |
| 9,646,368 | B2 | 5/2017 | Brendel | |
| 10,129,511 | B2 | 11/2018 | Nose | |
| 10,614,771 | B2 | 4/2020 | Pincenti et al. | |
| 11,488,285 | B2 | 11/2022 | Ho et al. | |
| 2010/0080459 | A1 | 4/2010 | Dai et al. | |
| 2016/0048723 | A1 * | 2/2016 | Jeong | G06F 18/22 382/197 |
| 2019/0197350 | A1 * | 6/2019 | Park | G06F 18/22 |
| 2020/0033930 | A1 * | 1/2020 | Belagal Math | G06F 1/3203 |
| 2021/0097646 | A1 * | 4/2021 | Choi | G06N 3/08 |
| 2022/0130053 | A1 * | 4/2022 | Funamoto | G06T 5/40 |
| 2022/0245861 | A1 | 8/2022 | Chang et al. | |
| 2022/0405538 | A1 | 12/2022 | Shaham et al. | |
| 2024/0273858 | A1 * | 8/2024 | Gintsburg | G06V 10/60 |

OTHER PUBLICATIONS

Rana, et al., "Deep Tone Mapping Operator for High Dynamic Range Images", in IEEE Transactions on Image Processing, vol. 29, Sep. 2, 2019, DOI:10.1109/TIP.2019.2936649, pp. 1285-1298.
Mantiuk, et al., "Color correction for tone mapping", in Computer graphics forum, vol. 28, No. 2, Mar. 27, 2009, pp. 193-202.
Erkut, et al., "HSV Color Histogram Based Image Retrieval with Background Elimination", in 1st International Informatics and Software Engineering Conference (UBMYK), Nov. 6, 2019, DOI: 10.1109/UBMYK48245.2019.8965513, pp. 1-5.
Zhang, et al., "Fast color correction using principal regions mapping in different color spaces", in Real-time imaging, Feb. 1, 2004, DOI: 10.1016/j.rti.2003.11.001, 9 pages.

* cited by examiner

IMAGE PROCESSING CIRCUIT, IMAGE SIGNAL PROCESSOR INCLUDING THE SAME, AND IMAGE PROCESSING METHOD

CROSS-REFERENCE TO RELATED APPLICATION

This application is based on and claims priority under 35 U.S.C. § 119 to Korean Patent Application No. 10-2023-0039017, filed on Mar. 24, 2023, and Korean Patent Application No. 10-2023-0086722, filed on Jul. 4, 2023 in the Korean Intellectual Property Office, both of which are incorporated by reference herein in their entireties.

BACKGROUND

The inventive concept relates to image processing, and more particularly, to an image processing circuit, an image signal processor including the same, and an image processing method.

An image signal processor provided in an imaging device, such as a camera or a smartphone may process an image provided from an image sensor to generate a converted image, such as an RGB image or YUV image. The image signal processor may output the color of the input image as is and may correct the color of the pixels of the input image and output the correct image. For example, using a smartphone's built-in camera, you may take images and correct the captured images.

There may be a variety of algorithms for correcting images. As a representative example, a method may be used to determine one scene that may represent the image and to correct the overall tone and/or color of the image to emphasize the scene.

However, when correcting the color of a pixel of an input image, there is a problem in terms of the color of other pixels that are to be corrected together with the specific pixel r.

SUMMARY

The inventive concept provides an image processing circuit that performs color shifting or color correction on a pixel basis of an image, an image signal processor including the same, and an image processing method.

According to an aspect of the inventive concept, there is provided an image processing circuit including a contents-aware circuit configured to receive histograms of a current image and a previous image, classify content for each pixel of the current image, and generate a shifting value representing a color shifting effect for each pixel of the current image, a color shifting circuit configured to generate an enhanced image by applying color shifting depending on the shifting value to each pixel of the current image, based on the shifting value, and a histogram generator configured to generate a histogram of the current image based on the classified content of the current image, wherein the generated histogram of the current image is used to generate a shifting value of a subsequent image.

According to another aspect of the inventive concept, there is provided an image processing method including receiving a current image, receiving a histogram of a previous image, classifying content for each pixel of the current image, generating a shifting value to be applied to each pixel based on the classified content for each pixel and the histogram of the previous image, generating an enhanced image by applying the shifting value to the current image, and generating a histogram of the current image.

According to another aspect of the inventive concept, there is provided an image signal processor that corrects an image to generate an enhanced image including a first circuit configured to generate an enhanced image by receiving histograms of a current image and a previous image, classifying content of the current image by pixel, generating a shifting value representing a color shifting effect for each pixel of the current image, and applying color shifting based on the shifting value to each pixel of the current image, and a second circuit configured to generate a histogram of the current image based on the classified content of the current image.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept are described in detail with reference to the attached drawings.

Figure 1:
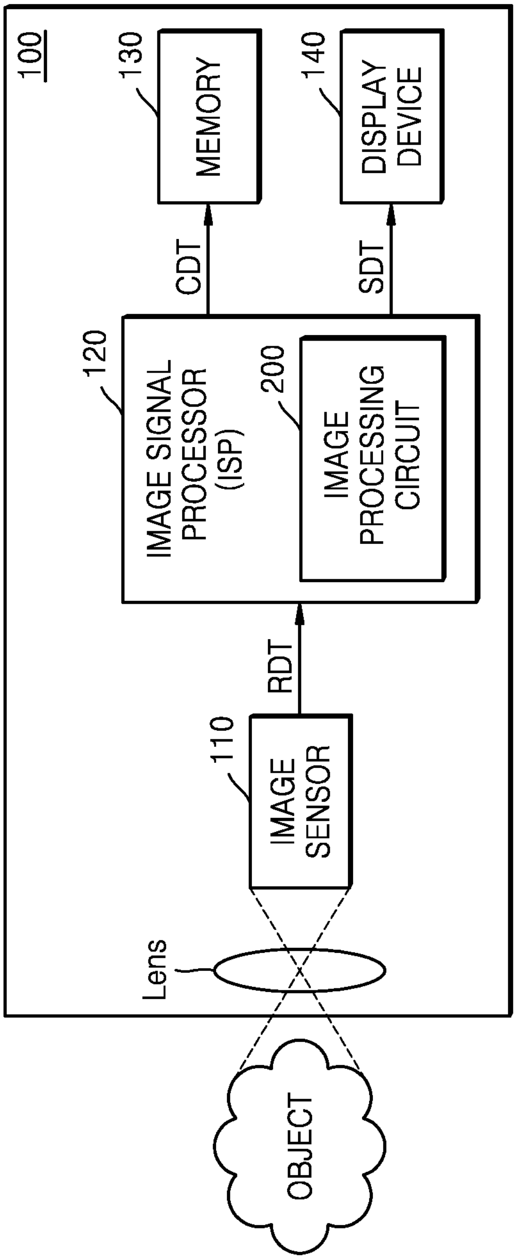
FIG. 1 is a block diagram showing an image processing system, according to an embodiment.

FIG. 1 is a block diagram showing an image processing system 100 according to an embodiment In various embodiments, the image processing system 100 may be embedded in or implemented as an electronic device. The electronic device may be implemented as, for example, a personal computer (PC), an internet of things (IoT) device, or a portable electronic device. The portable electronic device may be a laptop computer, a mobile phone, smartphone, tablet PC, personal digital assistant (PDA), enterprise digital assistant (EDA), digital still camera, digital video camera, audio device, portable multimedia player (PMP), personal navigation device (PND), MP3 player, handheld game console, e-book, wearable device, etc.

Referring to FIG. 1, the image processing system 100 may include an image sensor 110, an image signal processor 120, a memory 130, and a display device 140.

In various embodiments, the image sensor 110 may convert an optical signal (e.g., spatially distributed light intensity) of an image of an object (OBJECT) incident through an optical lens into an electrical signal (e.g., image data). The image sensor 110 may include, for example, a pixel array including a plurality of pixels arranged two-dimensionally and a sensing circuit, where the pixel array may convert received optical signals into electrical signals. The pixel array may be implemented with photoelectric conversion elements, such as, for example, a charge coupled device (CCD) or a complementary metal oxide semiconductor (CMOS) device, and may also be implemented with various types of photoelectric conversion elements. The sensing circuit may convert the electrical signal provided from the pixel array into an image and output the converted image as a raw image file RDT, that is uncompressed and unprocessed image data. The raw image RDT is an image input to an ISP and refers to an image before color correction or enhancement through color shifting. The image sensor 110 may be implemented as a semiconductor chip including a pixel array and a sensing circuit.

In various embodiments, the image signal processor 120 may process the raw image RDT provided from the image sensor 110 to generate a converted image CDT. The raw image RDT may correspond to a still image or one frame of a video including a plurality of frames. For example, the image signal processor 120 may image-process the raw image RDT based on set white balance, parameters, color space, etc. The converted image CDT may be a color space image, such as RGB, YUV, etc. The size, e.g., resolution, of the converted image CDT may be the same as that of the raw image RDT. The converted image CDT may be stored in the memory 130. The memory 130 may be volatile memory, such as dynamic random access memory (DRAM), static RAM (SRAM), or non-volatile memory, such as phase change RAM (PRAM), resistive RAM (ReRAM), or flash memory. The converted image CDT stored in the memory 130 may be subsequently used in the image processing system 100 or stored in a storage device.

In addition, the image signal processor 120 may generate a scaled image SDT by reducing or increasing the size of the converted image CDT. For example, the image signal processor 120 may generate the scaled image SDT by scaling the size or resolution of the converted image CDT to match the resolution of the display device 140. The image signal processor 120 may provide a scaled image SDT to the display device 140 for presentation to a user.

In addition, the image signal processor 120 may include an image processing circuit 200. The image processing circuit 200 may include a plurality of circuits for outputting an enhanced image by correcting the image. The image processing circuit 200 may perform image processing, such as color correction or color shift of an image. In various embodiments, the image processing circuit 200 may selectively perform image processing on target pixels that are identified for color correction or color shift rather than all pixels of the image. The image processing circuit 200 is described below with reference to FIG. 2.

Figure 2:
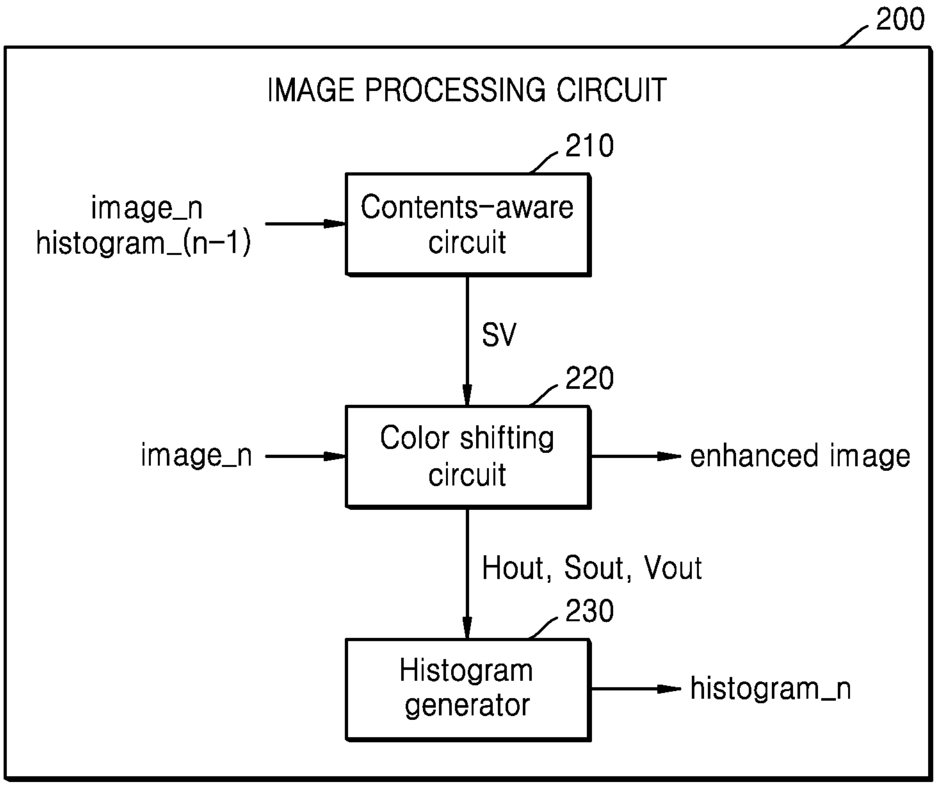
FIG. 2 is a block diagram showing an image processing circuit, according to an embodiment.

FIG. 2 is a block diagram showing an image processing circuit 200, according to an embodiment.

Referring to FIG. 2, the image processing circuit 200 may include a contents-aware circuit 210, a color shifting circuit 220, and a histogram generator 230. Each of the contents-aware circuit 210, color shifting circuit 220, and histogram generator 230 may be implemented as hardware, software (or firmware), or a combination of hardware and software to carry out the technical idea of the inventive concept. The image processing circuit 200 may further include an encoder for encryption of the enhanced image.

In various embodiments, the contents-aware circuit 210 may receive a histogram histogram_(n−1) of the current image, image_n, and the previous image, and classify the content for each pixel of the current image image_n. The contents-aware circuit 210 may generate a shifting value, SV, that represents the color shifting effect for each pixel of the current image. The contents-aware circuit 210 may receive the current image, image_n, that is the subject of color shifting and classify the content for each pixel using a neural network model, where for example, the contents-aware circuit 210 may classify the content of the current image, image_n, into k items, where k is a positive integer. In addition, the contents-aware circuit 210 may generate a shifting value, SV, representing the color shifting effect for each pixel using the classified content. Hereinafter, generating a neural network model and shifting values are described in detail with reference to FIG. 3.

In addition, the contents-aware circuit 210 may perform a segmentation operation to divide the current image, image_n, into a plurality of contents. The contents-aware circuit 210 may infer content corresponding to each of a plurality of pixels included in the current image, image_n, where the plurality of pixels may be associated based on content inference information. As an embodiment, the contents-aware circuit 210 may form segmentation by inferring the content corresponding to each pixel and form an area of pixels having the same content inference information. The contents-aware circuit 210 may calculate the confidence of the inferred content for each pixel of the current image, image_n.

In various embodiments, the color shifting circuit 220 may apply color shifting depending on the shifting value, SV, to each pixel of the current image, image_n, based on the shifting value SV. The color shifting circuit 220 may perform a series of processes to improve image quality or correct the image and generate an enhanced image as a result. The color shifting circuit 220 may receive a shifting value, SV, from the contents-aware circuit 210 and output color shifting result values Hout, Sout, and Vout. The shifting value SV may refer to a value that allows color shifting for a pixel of an image, and the color shifting result values Hout, Sout, and Vout may refer to the final value calculated in response to color shifting being applied to the pixels of the image.

In an embodiment, the color shifting circuit 220 may generate the enhanced image by selectively color shifting only target pixels that are identified for color correction or color shift rather than all pixels of the current image image_n.

In various embodiments, the histogram generator 230 may generate a histogram, histogram_n, of the current image based on the classified content of the current image, image_n. The histogram, histogram_n, of the current image generated by the histogram generator 230 may be used to generate a shifting value, SV, of a subsequent image following the current image, image_n. As an embodiment, by using the histogram, histogram_(n−1), of the previous image, the histogram generator 230 may generate a current image histogram, histogram_n, used for adjusting an effect of correction, an intensity of correction, or a color shifting intensity, so that only target pixels that are identified for color shifting of the current image, image_n, may be selectively color shifted. A shifting value to be applied to a pixel of the current image may be adjusted based on the weight and the shifting value and output a shifting result value.

As an embodiment, the image processing circuit 200 may classify the current image, image_n, by content and perform color shifting and/or color correction in units of areas including pixels classified as the same content.

In various embodiments, the image processing circuit 200 according to the embodiment may determine and apply a shifting value, SV, to be applied to target pixels that are identified for correction among a plurality of pixels included in the current image, image_n. By applying color shifting to identified target pixels to enable fine correction, images of improved quality may be obtained.

Figure 3:
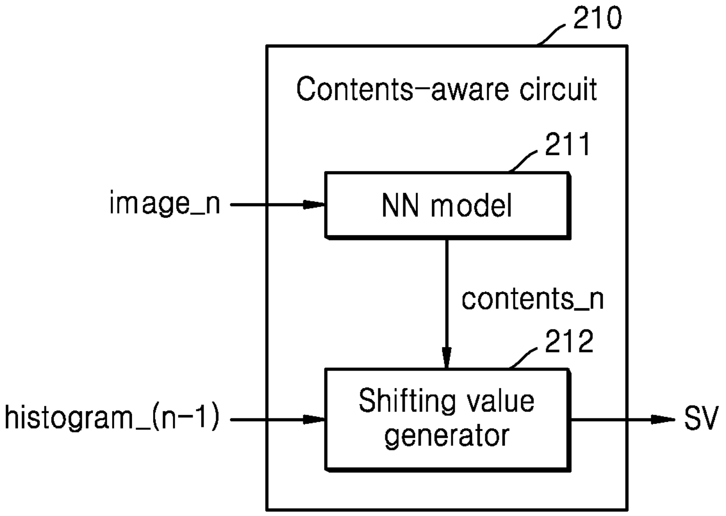
FIG. 3 is a block diagram showing a contents-aware circuit, according to an embodiment.

FIG. 3 is a block diagram showing a contents-aware circuit, according to an embodiment.

Referring to FIG. 3, a contents-aware circuit 210 may include a neural network model 211 and a shifting value generator 212.

In various embodiments, the neural network (NN) model 211 may receive the current image, image_n, recognize the content included in the current image, image_n, and classify the content pixel by pixel. The neural network model 211 may classify content for each pixel of the current image, image_n. The classifying of content for each pixel of the current image can include recognizing content included in the current image using the neural network model 211. The classified content, contents_n, may be used to generate a shifting value, SV. In one or more embodiments, the neural network model 211 may learn the relationship between pixels and a plurality of classified content to have different shifting effects. In this case, multiple contents may have different weights for the shifting effect.

In various embodiments, the neural network model 211 may be learned offline. As an embodiment, the neural network model 211 may be generated by training in a learning device, for example, a server that trains a neural network based on a large amount of training data. As an embodiment, the neural network model 210 may use random pixels and content labeled corresponding to random pixels as learning data. For example, the training image and the content labeled in each pixel of the training image may be used as training data.

Hereinafter, in this specification, the parameters (e.g., network topology, bias, weight, etc.) of the neural network model 211 are described assuming that they have already been determined through learning. However, the parameters are not limited thereto.

In various embodiments, the neural network model 211 may include at least one of various types of neural network models, such as convolution neural network (CNN), region with convolution neural network (R-CNN), and region proposal network (RPN), recurrent neural network (RNN), stacking-based deep neural network (S-DNN), state-space dynamic neural network (S-SDNN), deconvolution network, deep belief network (DBN), restricted Boltzmann machine (RBM), fully convolutional network, long short-term memory (LSTM) network, or classification network.

In various embodiments, the shifting value generator 212 may generate a shifting value, SV, by receiving the histogram, histogram_(n−1), of the previous image and the classified content, contents_n. The shifting value, SV, may refer to a value representing the color shifting effect for each pixel of the current image, image_n. In an embodiment, the shifting value, SV, may include a histogram, histogram_(n−1), of the previous image, content information signified by each pixel of the classified content, contents_n, and information about color shifting effects applied based on the reliability signified by each pixel. For example, the shifting value, SV, may mean the intensity of the color shifting effect. A shifting value may be generated and applied to each pixel based on the classified content for each pixel and the histogram of the previous image. The histogram of the current image may include the content classified by pixel, a first shifting value, SV1, a second shifting value, SV2, a third shifting value, SV3, and the number of pixels.

For example, assuming that the shifting value generator 212 generates the shifting value, SV, in the hue, saturation, value (HSV) domain, the shifting value, SV, may include a shifting value, SV, for hue, a shifting value, SV, for saturation, and a shifting value, SV, for brightness. The HSV domain is described with reference to FIGS. 10 and 12.

Figure 4:
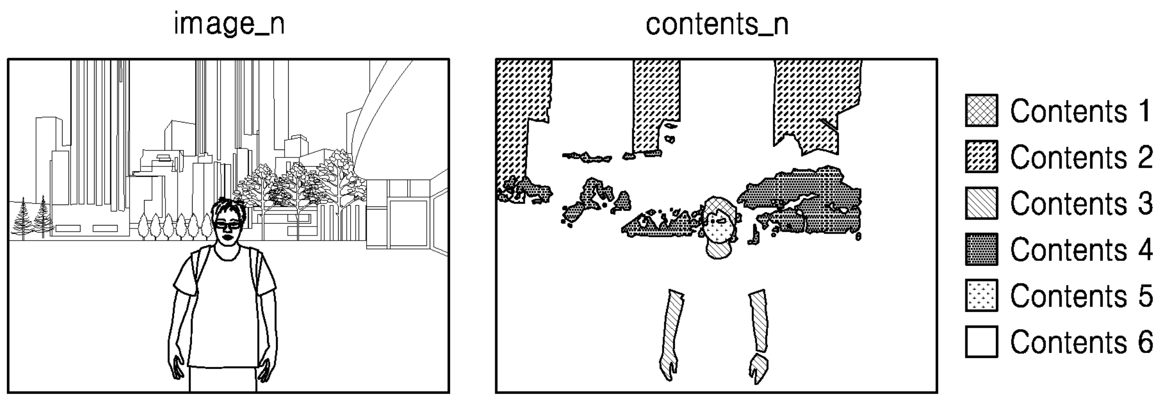
FIG. 4 is an example diagram showing content classification, according to an embodiment.

FIG. 4 is an example diagram showing content classification, according to an embodiment.

Referring to FIG. 4, the location of each pixel in the current image, image_n, may correspond to the location of each pixel in segmentation, where segmentation may refer to classifying the current image, image_n, by content. Through segmentation, pixels of the current image, image_n, may represent inferred content.

For example, in the current image, image_n, the portion of the image corresponding to human hair may be classified as first content, contents 1, the portion corresponding to the sky may be classified as second content, contents 2, the portion corresponding to human skin may be classified as third content, contents 3, the portion corresponding to a building may be classified as fourth content, contents 4, the portion corresponding to a human face may be classified as fifth content, contents 5, and other portions corresponding to the background may be classified as sixth content, contents 6.

According to various embodiments, pixels may be segmented based on the color shifting effect to be applied to each pixel of the current image, image_n. Pixels to which different color shifting effects should be applied may be segmented into different contents.

In addition, according to embodiments, by performing segmentation on a pixel basis, the accuracy of segmentation and/or content classification may be improved even in detailed and complex images, such as hair, the sky, and skin, where color shifting may be applied differently for each pixel.

Figure 5:
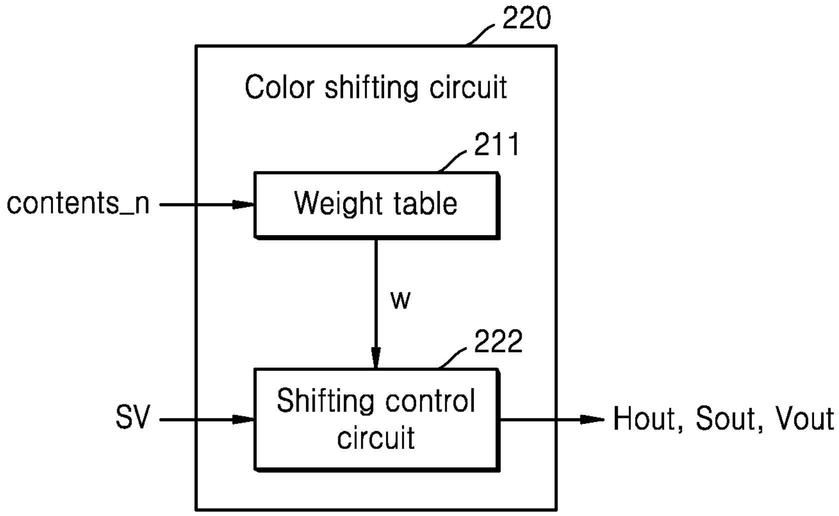
FIG. 5 is a block diagram showing a color shifting circuit, according to an embodiment.

FIG. 5 is a block diagram showing a color shifting circuit 220, according to an embodiment.

Referring to FIG. 5, the color shifting circuit 220 may include a weight table 221 and a shifting control circuit 222. The shifting control circuit 222 may be implemented in hardware, software (or firmware), or a combination of hardware and software.

In various embodiments, the weight table 221 may include different weights, w, for each pixel based on the classified content, contents_n. For example, each pixel may have a different weight, w, depending on the classified content, contents_n, of the current image, pixel segmentation, and reliability.

As an embodiment, when the content corresponding to a first pixel of the current image is the first content and indicates segmentation and reliability based on the first content, the first pixel may have a first weight, and when the content corresponding to a second pixel of the current image is second content and indicates segmentation and reliability based on the second content, the second pixel may have a second weight.

In various embodiments, the weight table 221 may be predetermined based on the color shifting circuit 220, but is not limited thereto. Information included in the weight table 221 may be changed. A weight may be set for each pixel based on classified content for each pixel, segmentation, and reliability of the current image.

In various embodiments, the shifting control circuit 212 may output shifting result values Hout, Sout, and Vout based on the weight, w, and the shifting value, SV. How the shifting control circuit 212 outputs the shifting result values Hout, Sout, and Vout is explained in Equation 1 below.

$$H_{output} = H_{input} + H'_V \times \text{weight} \quad \text{[Equation 1]}$$

$$S_{output} = S_{input} \times (1 + S'_V \times \text{weight})$$

$$V_{output} = V_{input} \times (1 + V'_V \times \text{weight})$$

In Equation 1, $$H'_V,\ S'_V,\ \text{and}\ V'_V$$

represent shifting values and may specifically represent hue shifting values, saturation shifting values, and brightness shifting values. weight may represent weight. $H_{input}$, $S_{input}$, and $V_{input}$ represent values for the current image in the HSV domain, and $H_{output}$, $S_{output}$, and $V_{output}$ may be shifting result values to which color shifting is applied.

Figure 6:
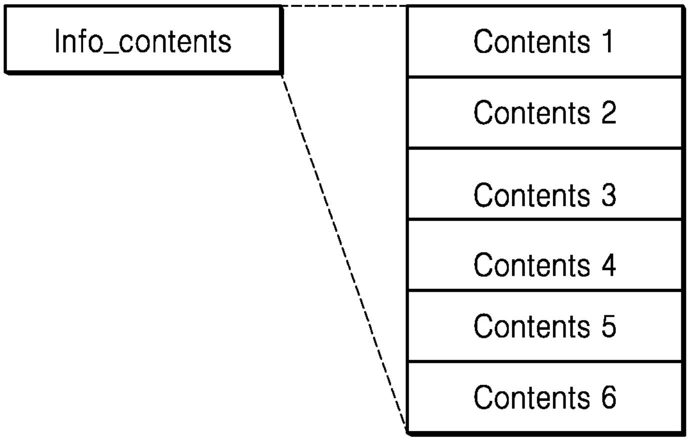
FIG. 6 is a diagram illustrating an example of content information, according to an embodiment.

FIG. 6 is a diagram illustrating an example of content information according to an embodiment.

Referring to FIG. 6, content information, info_contents, may be included in a contents-aware circuit (e.g., 210 in FIG. 2). The content information, info_contents, may include a plurality of contents by which pixels of an image may be classified.

In various embodiments, the content may be generated by classifying pixels of an image. For example, as for content, pixels to which the same color shifting is applied may be classified as one content, and pixels to which different color shifting is applied may be classified as different contents. Without being limited thereto, content may be generated based on characteristics of image pixels, for example, color information. The classifying of content for each pixel of the current image may include recognizing content included in the current image using a neural network model.

Figure 7:
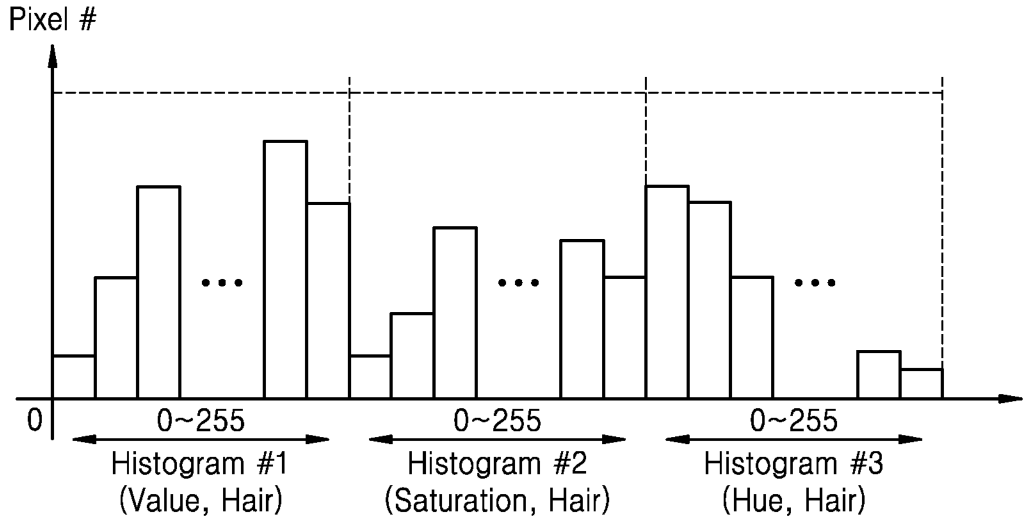
FIG. 7 is a diagram showing a histogram of an image, according to an embodiment.

According to an embodiment, the content information, info_contents, may include first to sixth content. For example, the first to sixth contents, contents 1 to contents 6, may correspond to face content, skin content, sky content, hair content, window content, and background content, respectively. In addition, the type and number of contents are not limited thereto and may change. FIG. 7 is a diagram showing a histogram of an image according to an embodiment.

Referring to FIG. 7, a histogram of an image is shown. The histogram of an image may be displayed in multiple content areas (e.g., hair) and may be displayed as hue, saturation, and value areas for one content. For example, FIG. 7 is a histogram expressing hair content in terms of hue, saturation, and value. The type of content is not limited thereto and may change.

On the horizontal axis of the histogram, 0 to 255 represent the overall gray level that each pixel value may represent. For example, when the pixel value is expressed as 8-bit data, the total number of gray levels may be 256 (0 to 255 gray levels). However, it is not limited thereto, and pixel values may be represented in various bit formats, such as 2 bit, 4 bit, and 16 bit. In FIG. 7, the vertical axis represents the number of pixels corresponding to each gray level. As described above, the histogram may indicate how many pixels each content includes for each hue, saturation, and value. A histogram of a current image may include the content classified by pixel, a first shifting value, a second shifting value, a third shifting value, and the number of pixels.

Figure 8:
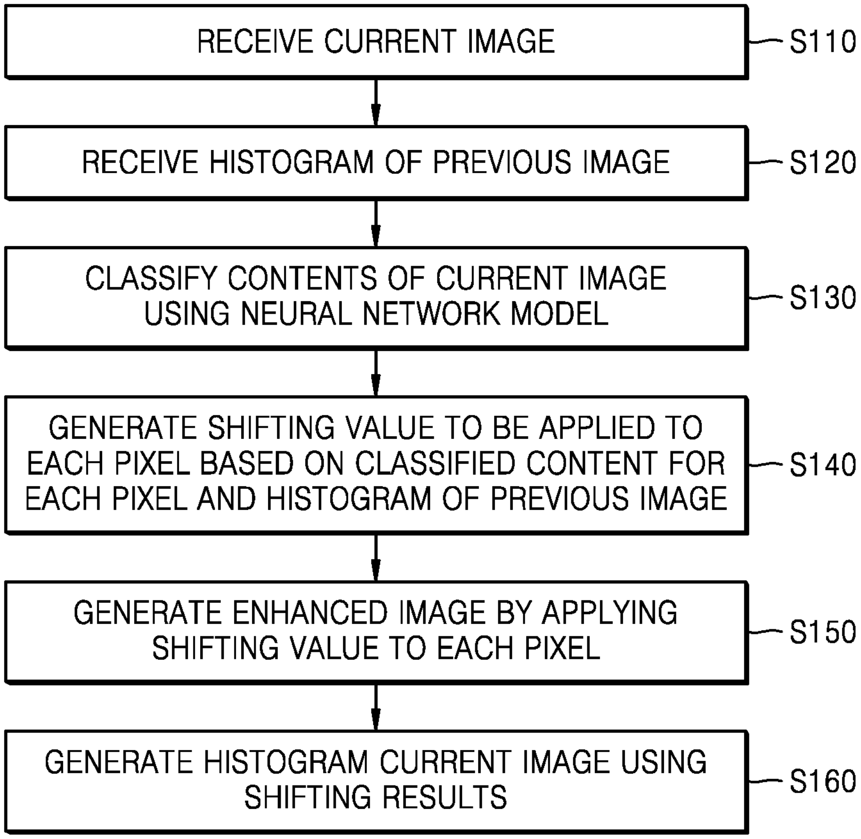
FIG. 8 is a flowchart showing the sequence of an image processing method, according to an embodiment.

FIG. 8 is a flowchart showing the sequence of an image processing method, according to an embodiment.

Referring to FIGS. 2, 3, 5, and 8, in operation S110, an operation of receiving the current image image_n may be performed. For example, the contents-aware circuit 210 may obtain the current image image_n generated from an image sensor or externally.

In operation S120, an operation of receiving the histogram, histogram_(n−1), of the previous image may be performed. For example, the contents-aware circuit 210 may obtain a histogram, histogram_(n−1), of the previous image generated by the histogram generator 230.

In operation S130, the contents of the current image, image_n, may be classified using the neural network model 211. As an embodiment, the neural network model 211 may be learned using the learning image and the correct answer content labeled with each pixel of the learning image, as learning data. In this case, the correct answer content may correspond to the color shifting to be applied to each pixel of the learning image. As an embodiment, the content to which each pixel of the current image, image_n, belongs may be inferred by the neural network model 211, and the reliability of the inferred content for each pixel may be calculated.

In operation S140, a shifting value SV to be applied to each pixel may be generated based on the classified content, contents_n, and the histogram, histogram_(n−1), of the previous image. For example, the shifting value, SV, may represent the correction effect to be applied to each pixel and the strength of the correction effect. In an embodiment, when generating a shifting value, SV, in the HSV domain, the shifting value, SV, may include a hue shifting value Hv, a saturation shifting value Sv, and a brightness shifting value Vv.

In operation S150, an enhanced image may be generated by applying a shifting value, SV, to each pixel. As an embodiment, the color shifting circuit 220 may perform color shifting on each pixel of the current image, image_n, based on the shifting value, SV. In this case, the enhanced image may be one in which the image quality of the current image image_n has been improved.

In operation S160, a histogram, histogram_n, of the current image may be generated using the shifting results Hout, Sout, and Vout. For example, the histogram generator 230 may generate a histogram, histogram_n, of the current image based on the classified contents, contents_n, of the current image. The generated histogram, histogram_n, of the current image may be used to generate a shifting value of a subsequent image following the current image.

In response, the enhanced image is provided to the encoder, and the operation of compressing the enhanced image into various formats may be further performed.

Figure 9:
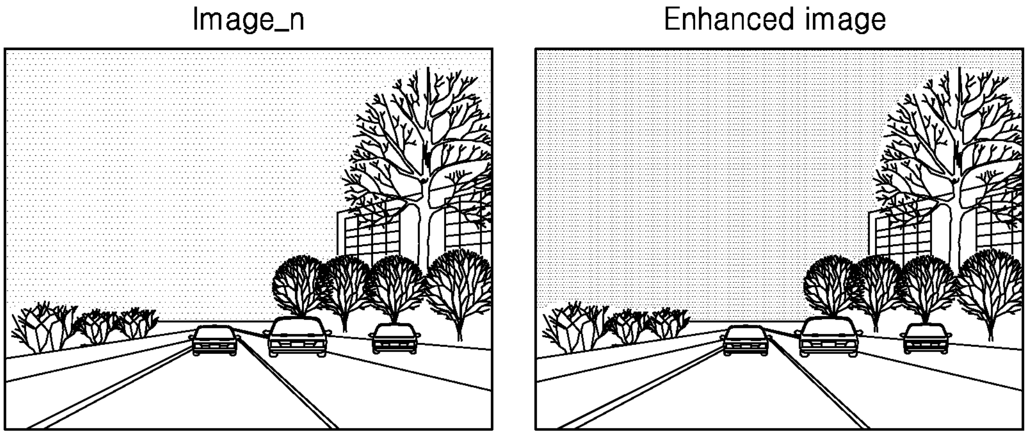
FIG. 9 is a diagram showing an example of an image processing result, according to an embodiment.

FIG. 9 is a diagram showing an example of an image processing result according to an embodiment.

Referring to FIGS. 1, 2, and 9, a left image may be an image input to the image processing circuit. For example, the left image may be a raw image RDT and/or a current image, image_n, generated by the image sensor 110. A right image may be an enhanced image output from an image processing circuit. It may be seen that the pixels of the sky content in the right image are color shifted. Pixels other than the sky, such as trees, buildings, and roads, are not color shifted. In this way, the image processing circuit 200 may recognize and classify the content of the image and may selectively perform color shifting or color correction on target pixels included in content to be color shifted, rather than on all pixels of classified content.

According to embodiments, pixels may be segmented taking into account the color shifting effect to be applied to each pixel in the image. The pixels to which different color shifting effects should be applied may be segmented into different contents.

In addition, according to embodiments, by performing segmentation per pixel, the accuracy of segmentation and/or content classification may be improved, and color shifting may be applied differently for each pixel.

Figure 10:
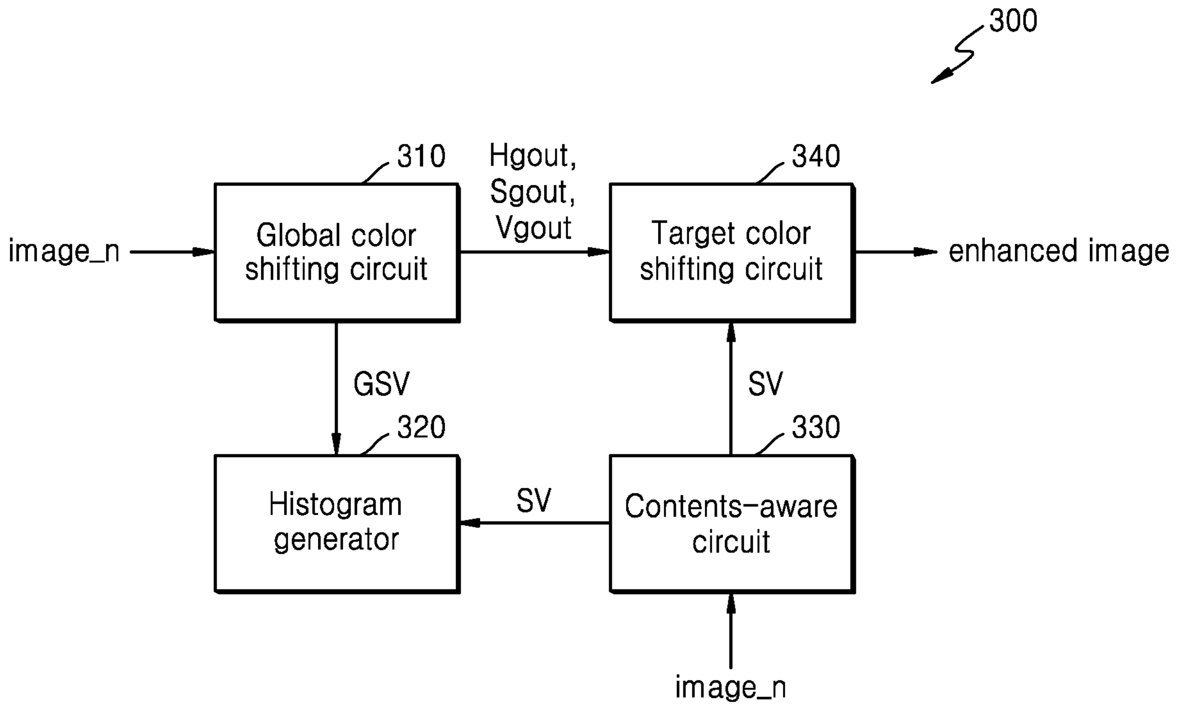
FIG. 10 is a block diagram showing an image processing circuit, according to an embodiment.

FIG. 10 is a block diagram showing an image processing circuit 300 according to an embodiment. The image processing circuit 300 of FIG. 10 is a modification of the image processing circuit 200 of FIG. 2, and thus, the description already given above is omitted.

Compared to the image processing circuit 200 of FIG. 2, the image processing circuit 300 of FIG. 10 may further include a global color shifting circuit 310. In addition, the image processing circuit 300 may include a contents-aware circuit 330, a target color shifting circuit 340, and a histogram generator 320. The target color shifting circuit 340 of FIG. 10 may correspond to the color shifting circuit 220 of FIG. 2.

In various embodiments, the global color shifting circuit 310 may receive the current image, image_n, designate a shifting area for the current image pixel, and perform color shifting for each pixel in the designated shifting area. Designating the shifting area of the global color shifting circuit 310 and performing global color shifting are explained with reference to FIGS. 11 and 12.

Referring to FIGS. 2 and 10 together, as an embodiment, the circuit including the contents-aware circuit 210 and the color shifting circuit 220 may be referred to as a first circuit, and the histogram generator 230 may be referred to as a second circuit. Accordingly, the image processing circuit 300 of FIG. 10 may further include a global color shifting circuit 310 compared to the image processing circuit 200 of FIG. 2. The first circuit may include a contents-aware circuit 330, a target color shifting circuit 340, and the global color shifting circuit 310.

As an embodiment, the first circuit may recognize the content included in the current image, image_n, using a neural network model and classify the content pixel by pixel. The first circuit may generate a shifting value, SV, using the histogram, histogram_(n−1), of the previous image and the content, contents_n, classified by pixel of the current image, image_n. The first circuit may set a weight for each pixel based on classified content, contents_n, segmentation, and reliability. The first circuit may adjust the shifting value SV based on the weight and the shifting value, SV, and output the shifting result value. The first circuit may generate an enhanced image by applying a shifting value, SV, to each pixel of the current image, image_n.

As an embodiment, the second circuit may generate a histogram histogram_n of the current image. The generated histogram, histogram_n, of the current image may be used to generate a shifting value, SV, of the subsequent image. For example, the second circuit may generate a histogram histogram_n of the current image based on the classified contents contents_n. The second circuit may receive the shifting results Hout, Sout, and Vout from the first circuit and generate a histogram histogram_n of the current image.

Figure 11:
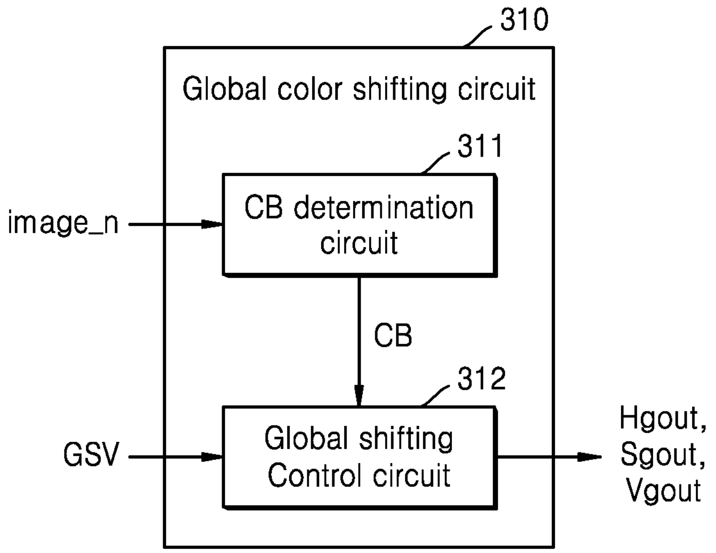
FIG. 11 is a block diagram showing a global color shifting circuit, according to an embodiment.

FIG. 11 is a block diagram showing a global color shifting circuit 310 according to an embodiment.

Referring to FIG. 11, the global color shifting circuit 310 may include a color box determination circuit 311 and a global shifting control circuit 312.

In various embodiments, the color box determination circuit 311 may designate a shifting area for each pixel of the current image image_n. A designated shifting area may be referred to as a color box CB. The color box determination circuit 311 may receive the current image image_n and designate the color box CB.

In various embodiments, the global shifting control circuit 312 may perform global color shifting based on a designated area. The global shifting control circuit 312 may generate global shifting result values Hgout, Sgout, and Vgout based on the color box CB and the global shifting value GSV.

Hereinafter, a method of specifying a color box for global color shifting is described with reference to FIG. 12.

Figure 12:
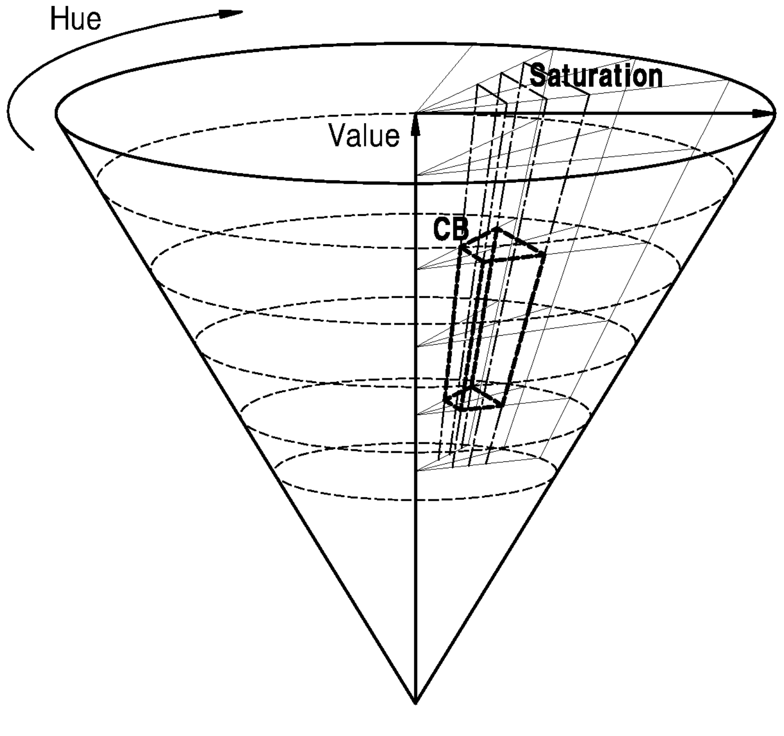
FIG. 12 is a diagram for explaining an HSV domain, according to an embodiment.

FIG. 12 is a diagram for explaining an HSV domain according to an embodiment.

Referring to FIG. 12, the cone-shaped HSV domain is displayed and may be expressed as hue H in the circumferential direction of the cone, saturation S in the radial direction, and value V in the height direction. The HSV domain is a method of expressing color using hue, saturation, and value and may be a method of arranging colors based on the method. The HSV domain may be a method of expressing the color of a pixel by expressing the values of H, S, and V as coordinates. For example, colors may be expressed with (H, S, V) coordinates in the HSV domain.

H may be expressed as an angle, with red corresponding to 0° and cyan corresponding to 180°. In the domain, H may be expressed as 0 to 360 degrees, which is the angle corresponding to the circumference of the circle. S is expressed as a percentage (%) and may be 0% when there is no saturation or 100% when saturation is maximum. V may be expressed as a percentage (%), and is 0% when there is no brightness, and 100% when brightness is maximum. In the HSV domain, V may be expressed as 0 to 100, which is a number corresponding to minimum to maximum.

In various embodiments, the color box CB may be a designated area to apply shifting of image pixels. That is, the color box CB may refer to a shifting area designated by the user (or application). Global color shifting may be applied in the color box CB.

$$H_{gout} = H_{input} + H_V$$
$$S_{gout} = S_{input} \times (1 + S_V)$$
$$V_{gout} = V_{input} \times (1 + V_V)$$
[Equation 2]

In Equation 2, $H_V$, $S_V$, $V_V$ represent global shifting values and specifically may represent a hue global shifting value, a saturation global shifting value, and a brightness global shifting value. $H_{input}$, $S_{input}$, and $V_{input}$ refer to values representing the current image in the HSV domain, and $H_{gout}$, $S_{gout}$, and $V_{gout}$ may refer to shifting result values to which global color shifting is applied. A shifting area of the current image pixel may be designated, and color shifting applied to each pixel of the pixels in the designated shifting area. The shifting value may include a first shifting value, a second shifting value, and a third shifting value expressed in the (hue, saturation, value) HSV domain.

Figure 13:
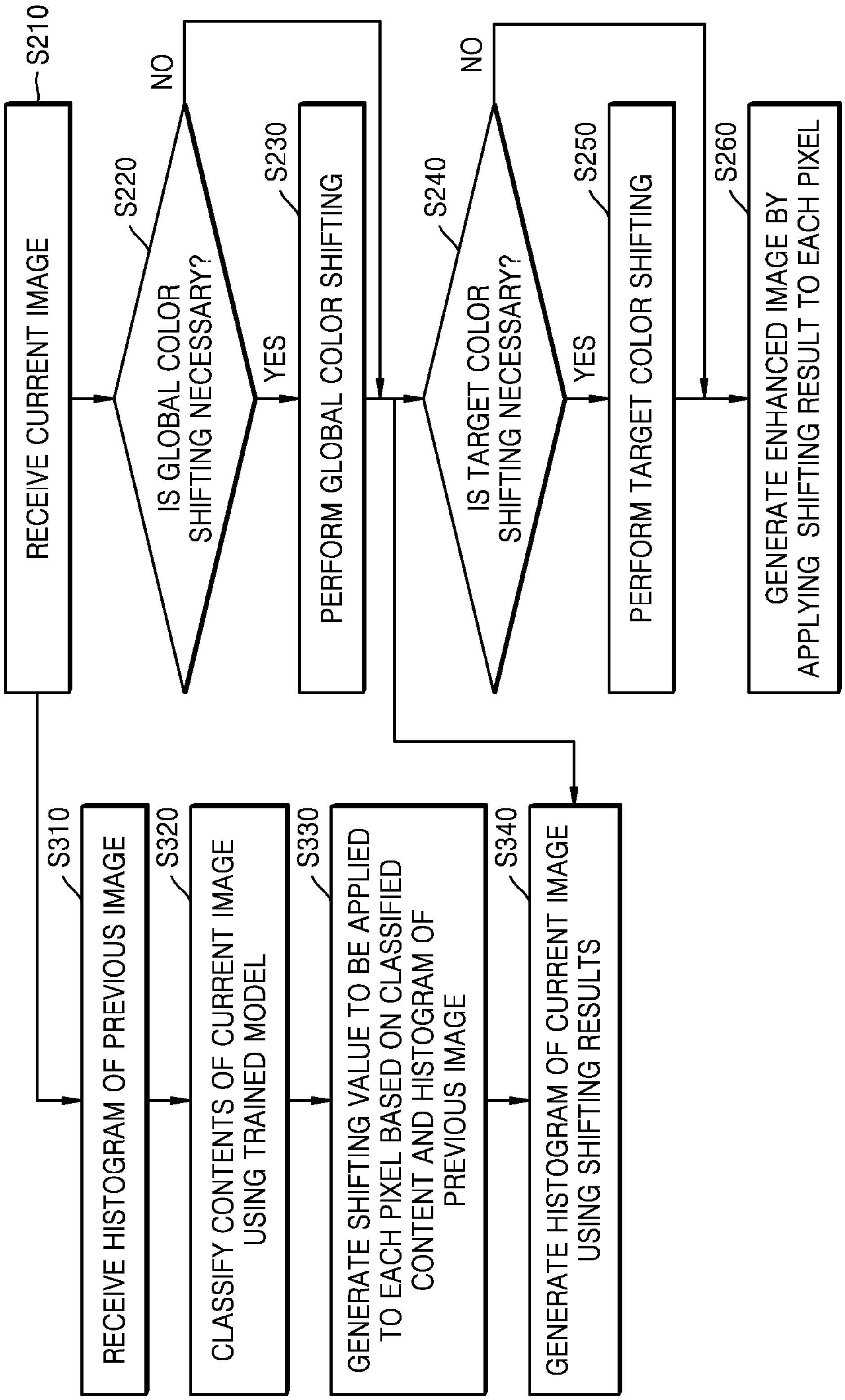
FIG. 13 is a flowchart showing the sequence of an image processing method, according to an embodiment.

FIG. 13 is a flowchart showing the sequence of an image processing method, according to an embodiment.

Referring to FIGS. 10 and 13 together, in operation S210, an operation of receiving the current image image_n may be performed. For example, the contents-aware circuit 330 may acquire the current image, image_n, generated from an image sensor or externally.

In operation S310, an operation of receiving the histogram, histogram_(n−1), of the previous image may be performed. For example, the contents-aware circuit 330 may obtain a histogram, histogram_(n−1), of the previous image generated by the histogram generator 320.

In operation S320, the content of the current image, image_n, may be classified using a neural network model. As an embodiment, the content to which each pixel of the current image, image_n, belongs is classified by the neural network model, and the reliability of the classified content for each pixel may be calculated.

In operation S330, a shifting value SV to be applied to each pixel may be generated based on the classified content, contents_n, and the histogram, histogram_(n−1), of the previous image. In an embodiment, when generating a shifting value, SV, in the HSV domain, the shifting value, SV, may include a hue shifting value Hv, a saturation shifting value Sv, and a brightness shifting value Vv.

In operation S220, it is possible to determine whether global color shifting is to be applied. When global color shifting is not necessary (No in S220), global color shifting of S230 may be omitted and proceed to the next operation. Conversely, when global color shifting is necessary (Yes in S220), in operation S230, global color shifting may be performed.

In operation S340, a histogram, histogram_n, of the current image may be generated using the global color shifting results Hout, Sout, and Vout. In this case, the global color shifting result values Hout, Sout, and Vout may be a value that is the same as the value of the received image that is not changed or changed.

In operation S240, it may be determined whether target color shifting is necessary.

In operation S250, when target color shifting is necessary (Yes in S240), target color shifting may be performed. Conversely, in operation S250, when target color shifting is not necessary (No in S240), target color shifting may be omitted and the process may proceed to the next operation.

In operation S260, an enhanced image with a shifting value, SV, applied to each pixel may be generated. As an embodiment, the target color shifting circuit 340 may perform color shifting on each pixel of the current image, image_n, based on the shifting value SV. In this case, the enhanced image may be an improved image quality of the current image, image_n.

Meanwhile, operations S210 to S260 may be performed in parallel or sequentially with operations S310 to S340.

Figure 14:
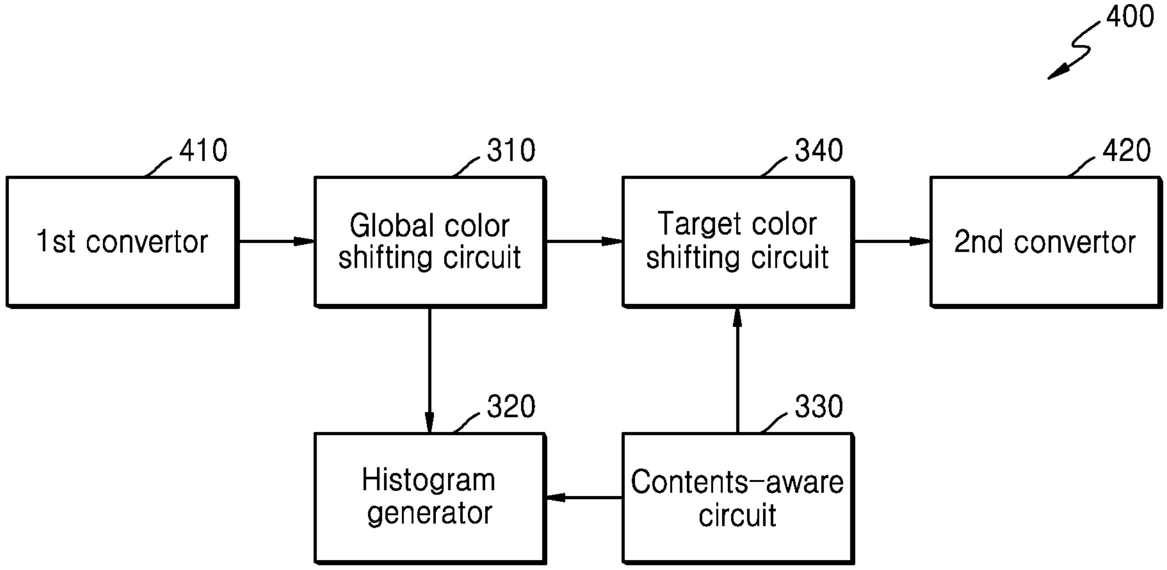
FIG. 14 is a block diagram showing an image processing circuit, according to an embodiment.

FIG. 14 is a block diagram showing an image processing circuit 400 according to an embodiment. Because the image processing circuit 400 of FIG. 14 is similar to the image processing circuit 300 of FIG. 10, the description already given above is omitted.

Compared to the image processing circuit 300 of FIG. 10, the image processing circuit 400 of FIG. 14 may further include a first converter 410 and a second converter 420 that change the pixel domain of the image.

In various embodiments, the first converter 410 may convert the pixel domain of the image from the (red, green, blue) RGB domain to the (hue, saturation, value) HSV domain. The second converter 420 may convert the pixel domain of the image from the HSV domain to the RGB domain.

Figure 15:
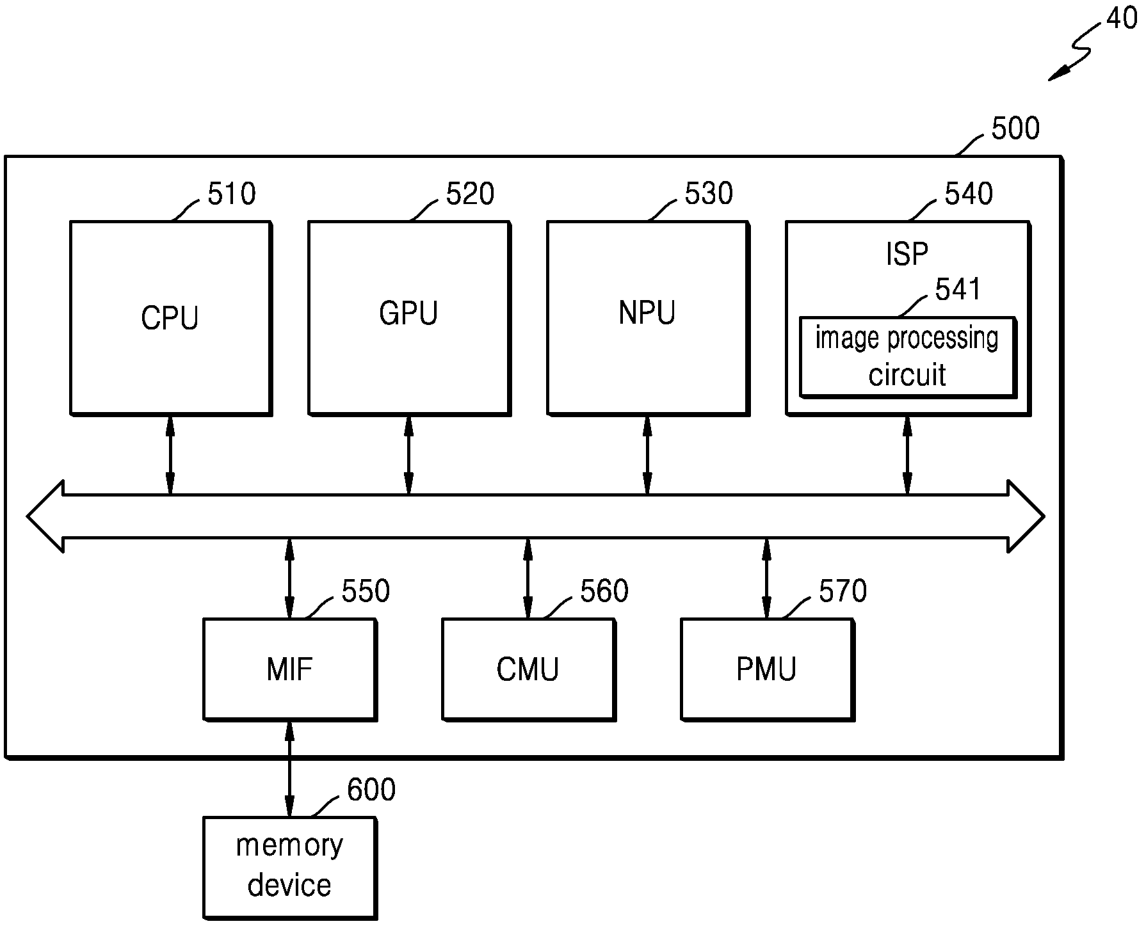
FIG. 15 is a block diagram showing a system, according to an embodiment.

FIG. 15 is a block diagram showing a system 40 according to an embodiment.

Referring to FIG. 15, the system 40 may be implemented as a handheld device, such as a mobile phone, smartphone, tablet computer, PDA, EDA, digital still camera, digital video camera, PMP, PND, handheld game console, or e-book.

In various embodiments, the system 40 may include an SoC 500 and a memory device 600. The SoC 500 may include a central processing unit (CPU) 510, a graphics processing unit (GPU) 520, a neural processing unit (NPU) 530, an image signal processor (ISP) 540, a memory interface (MIF) 550, a clock management unit (CMU) 560, or a power management unit (PMU) 570. The CPU 510, the GPU 520, the NPU 530, and the ISP 540 may be referred to as a master IP device, and the MIF 550 may be referred to as a slave IP device.

At least one of the CPU 510, the GPU 520, the NPU 530, or the ISP 540 may include the image processing circuits 200, 300, and 400 described above with reference to FIGS. 1 to 14. Each component of the image processing circuit 200, 300, and 400 may be implemented in the same IP device, and at least one component of the image processing circuit 200, 300, and 400 may be implemented in another IP device.

For example, the ISP 540 may classify image content by pixel and perform pixel-level color shifting using the classified content to generate an enhanced image. In addition, the ISP 540 may generate a histogram of the image based on the classified content, and the histogram of the generated image may be used to generate color shifting values for subsequent images.

In various embodiments, the CPU 510 may process or execute instructions and/or data stored in the memory device 600 in response to a clock signal generated by the CMU 560.

In various embodiments, the GPU 520 may obtain image data stored in the memory device 600 in response to a clock signal generated by the CMU 560. The GPU 520 may generate data for an image output through a display device (not shown) from image data provided by the MIF 550 and may encode the image data.

In various embodiments, the NPU 530 may refer to any device that executes a machine learning model. The NPU 530 may be a hardware block designed to execute a machine learning model. The machine learning model may be a model based on an artificial neural network, decision tree, support vector machine, regression analysis, Bayesian network, genetic algorithm, etc. The artificial neural networks may include, as non-limiting examples, a CNN, an R-CNN, an RPN, an RNN), an S-DNN, an S-SDNN, a deconvolution network, a DBN, an RBM, a fully convolutional network, an LSTM network, or a classification network.

In various embodiments, the ISP 540 may perform signal processing on raw data received from an image sensor (not shown) located outside the SoC 500 and generate digital data with enhanced image quality.

In various embodiments, the MIF 550 may provide an interface to the memory device 600 located outside the SoC 500. The memory device 600 may be DRAM, phase-change random access memory (PRAM), resistive random access memory (ReRAM), or flash memory.

The CMU 560 may generate a clock signal and provide the clock signal to components of the SoC 500. The CMU 560 may include a clock generation device such as a phase locked loop (PLL), a delayed locked loop (DLL), and a crystal. The PMU 570 may convert external power to internal power and supply the internal power to components of the SoC 500.

In various embodiments, the SoC 500 may further include volatile memory. The volatile memory may be implemented with DRAM, SRAM, etc. The volatile memory may store various programs and data for the operation of an image processing circuit and may store data generated by the image processing circuit.

As an embodiment, each of the contents-aware circuit, the color shifting circuit, and the histogram generator included in the image processing circuit 541 may access volatile memory through direct memory access (DMA). To access the volatile memory, the SoC 500 may further include an access device, such as a DMA controller, memory DMA (MDMA), peripheral DMA (PDMA), remote DMA (RDMA), and smart DMA (SDMA).

Figure 16:
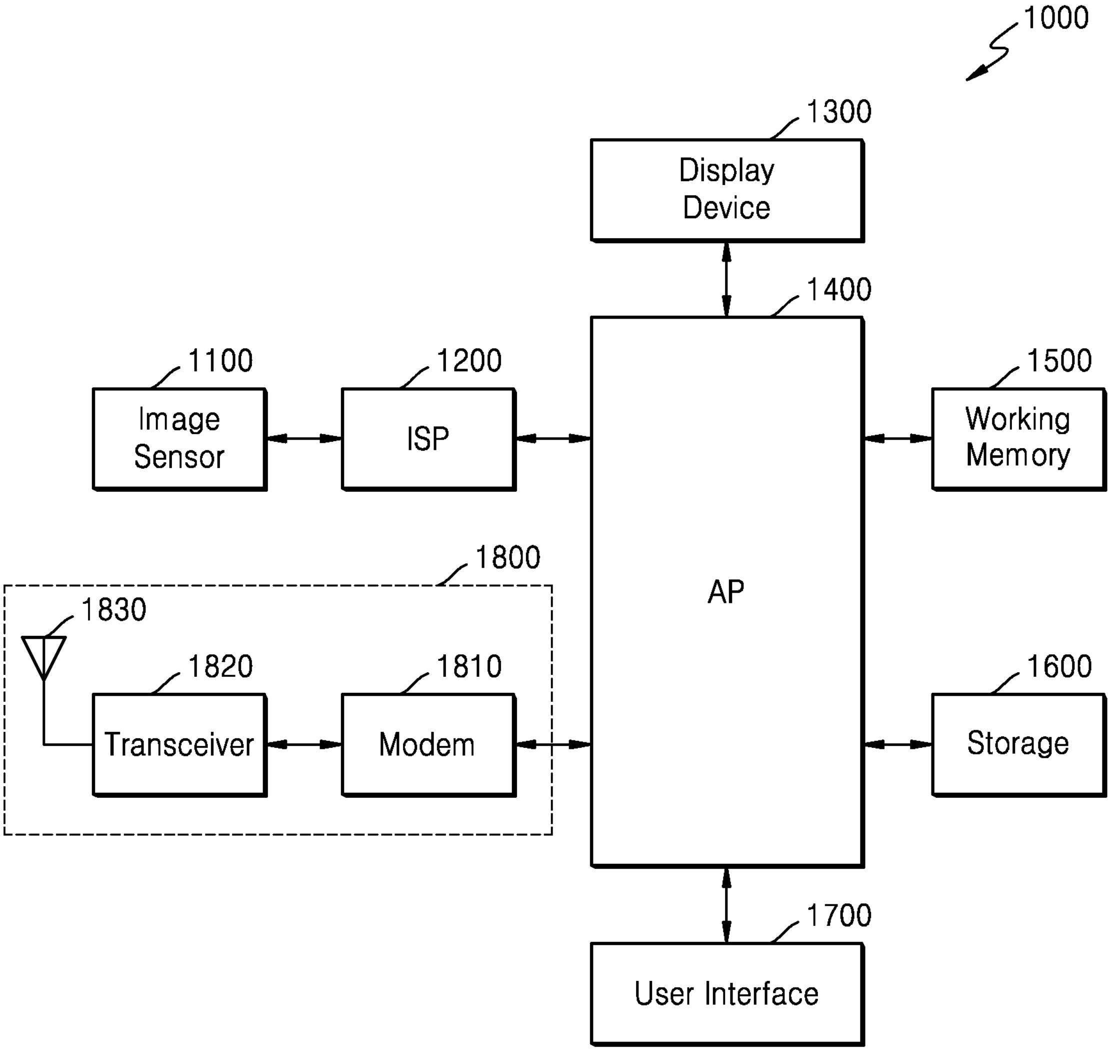
FIG. 16 is a block diagram showing an electronic device, according to an embodiment.

FIG. 16 is a block diagram showing an electronic device 1000 according to an embodiment.

Referring to FIG. 16, the electronic device 1000 according to an embodiment may include an image sensor 1100, an image signal processor 1200, a display device 1300, an application processor 1400, a working memory 1500, a storage 1600, a user interface 1700, and a wireless transceiver 1800, and the image signal processor 2000 may be implemented as an integrated circuit separate from the application processor 1400.

As an embodiment, the image processing circuits 200, 300, and 400 described above with reference to FIGS. 1 to 15 may be implemented in the ISP 1200 and/or the AP 1400.

In various embodiments, the image sensor 1100 may generate image data, such as raw image data, based on the received optical signal and provide binary data to the image signal processor 1200. The application processor 1400 controls the overall operation of the electronic device 1000 and may be provided as an SoC that runs an application program, operating system, etc. The application processor 1400 may control the operation of the image signal processor 1200 and may provide converted image data generated by the image signal processor 1200 to the display device 1300 or store the converted image data in the storage 1600.

In various embodiments, the working memory 1500 may store programs and/or data that the application processor 1400 processes or executes. The storage 1600 may be implemented as a non-volatile memory device, such as NAND flash or resistive memory. For example, the storage 1600 may be provided as a memory card, such as multimedia card (MMC), embedded MMC (eMMC), secure digital (SD), micro SD. The storage 1600 may store data and/or programs for execution of algorithms that control the image processing operations of the image signal processor 1200, and when an image processing operation is performed, data and/or programs may be loaded into the working memory 1500.

In various embodiments, the user interface 1700 may be implemented with various devices capable of receiving user input, such as a keyboard, curtain key panel, touch panel, fingerprint sensor, and microphone. The user interface 1700 may receive user input and provide a signal corresponding to the received user input to the application processor 1400. The wireless transceiver 1800 may include a modem 1810, a transceiver 1820, and an antenna 1830.

While the inventive concept has been particularly shown and described with reference to embodiments thereof, it will be understood that various changes in form and details may be made therein without departing from the spirit and scope of the following claims.

What is claimed is:

1. An image processing circuit comprising:

a contents-aware circuit configured to receive a current image and a histogram of a previous image, classify content for each pixel of the current image, and generate a shifting value representing a color shifting effect for each pixel of the current image;

a color shifting circuit configured to generate an enhanced image by applying color shifting depending on the shifting value to each pixel of the current image, based on the shifting value; and a histogram generation circuit configured to generate a histogram of the current image based on the classified content of the current image, wherein the generated histogram of the current image is used to generate a subsequent shifting value of a subsequent image.

2. The image processing circuit of claim 1, wherein the contents-aware circuit comprises a neural network model configured to receive the current image, recognize content included in the current image, and classify the content by pixel.

3. The image processing circuit of claim 1, wherein the color shifting circuit comprises a weight table including weights for each pixel based on content classified for each pixel, segmentation, and reliability of the current image; and a shifting control circuit configured to adjust the shifting value to be applied to a pixel of the current image based on the weight and the shifting value and output a shifting result value.

4. The image processing circuit of claim 1, wherein the content for each pixel of the current image includes at least one of face content, skin content, sky content, hair content, tree content, window content, or background content.

5. The image processing circuit of claim 1, wherein the image processing circuit is included in an image signal processor (ISP).

6. The image processing circuit of claim 1, further comprising a global color shifting circuit configured to receive the current image, designate a shifting area of the current image, and apply color shifting for each pixel to pixels in the designated shifting area.

7. The image processing circuit of claim 6, wherein the global color shifting circuit comprises a color box determination circuit configured to designate a shifting area for each pixel of the current image; and a global shifting control circuit configured to perform color shifting for each pixel based on the designated shifting area.

8. The image processing circuit of claim 1, further comprising:

a first converter converting a pixel domain from a (red, green, blue) RGB domain to a (hue, saturation, value) HSV domain; and a second converter converting the pixel domain from the HSV domain to the RGB domain.

9. The image processing circuit of claim 1, wherein the shifting value includes a first shifting value, a second shifting value, and a third shifting value expressed in a (hue, saturation, value) HSV domain.

10. The image processing circuit of claim 1, wherein the histogram of the current image includes the content classified by pixel, a first shifting value, a second shifting value, a third shifting value, and a number of pixels.

11. An image processing method comprising:

receiving a current image;

receiving a histogram of a previous image;

classifying content for each pixel of the current image;

generating a shifting value to be applied to each pixel based on the classified content for each pixel and the histogram of the previous image;

generating an enhanced image by applying the shifting value to the current image; and generating a histogram of the current image.

12. The image processing method of claim 11, wherein the classifying of content for each pixel of the current image includes recognizing content included in the current image using a neural network model.

13. The image processing method of claim 11, wherein the generating of the enhanced image further comprises setting a weight for each pixel based on classified content for each pixel, segmentation, and reliability of the current image; and adjusting the shifting value to be applied to a pixel of the current image based on the weight and the shifting value and outputting a shifting result value.

14. The image processing method of claim 11, wherein the shifting value includes a first shifting value, a second shifting value, and a third shifting value expressed in a (hue, saturation, value) HSV domain.

15. The image processing method of claim 11, wherein the histogram of the current image includes the content classified by pixel, a first shifting value, a second shifting value, a third shifting value, and a number of pixels.

16. An image processing system comprising:

an image processing circuit having a contents-aware circuit configured to receive a histogram of a previous image, classify content for each pixel of a current image, and generate a shifting value representing a color shifting effect for at least one pixel of the current image;

a color shifting circuit configured to generate an enhanced image by applying color shifting to the at least one pixel of the current image, based on the shifting value; and a histogram generation circuit configured to generate a histogram of the current image based on the classified content of the current image.

17. The image processing system of claim 16, wherein classifying of content for each pixel of the current image includes using a neural network model to identify content in the current image.

18. The image processing system of claim 16, further comprising an image sensor configured to generate a raw image file, and an image signal processor configured to process the raw image file from the image sensor.

19. The image processing system of claim 16, wherein the image processing circuit is included in an image signal processor.

* * * * *